(12) United States Patent
Lee et al.

(10) Patent No.: US 9,759,960 B2
(45) Date of Patent: Sep. 12, 2017

(54) DISPLAY PANEL

(71) Applicant: INNOLUX CORPORATION, Chu-Nan, Miao-Li County (TW)

(72) Inventors: Hsin-Yu Lee, Chu-Nan (TW); Ching-Che Yang, Chu-Nan (TW); Chen-Kuan Kao, Chu-Nan (TW); Kuei-Ling Liu, Chu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 0 days.

(21) Appl. No.: 14/558,010

(22) Filed: Dec. 2, 2014

(65) Prior Publication Data

US 2016/0085093 A1 Mar. 24, 2016

(30) Foreign Application Priority Data

Sep. 22, 2014 (TW) .............................. 103132608 A

(51) Int. Cl.
*G02F 1/1337* (2006.01)
*G02F 1/1343* (2006.01)
*G02F 1/1335* (2006.01)

(52) U.S. Cl.
CPC .. *G02F 1/134336* (2013.01); *G02F 1/133707* (2013.01); *G02F 2001/133531* (2013.01)

(58) Field of Classification Search
CPC ............... G02F 1/137; G02F 1/133528; G02F 1/134336
USPC ...................................... 349/33, 96, 129, 146
See application file for complete search history.

(56) References Cited

U.S. PATENT DOCUMENTS

2009/0096978 A1\* 4/2009 Kim .................. G02F 1/134309
349/144
2011/0310335 A1\* 12/2011 Hashimoto ....... G02F 1/133707
349/96

\* cited by examiner

*Primary Examiner* — Nathanael R Briggs
(74) *Attorney, Agent, or Firm* — Liu & Liu

(57) ABSTRACT

A display panel including a first polarizer, a second polarizer, a first substrate, a second substrate, a liquid crystal layer, and a pixel array is provided. The pixel array disposed on the first substrate includes a pixel area wherein a pixel electrode is disposed. The pixel electrode includes a first main electrode, a second main electrode, which substantially perpendicularly intersecting for defining a first domain, a second domain, a third domain, and a fourth domain of the pixel area, and a plurality of branch electrodes separately connected to the first or the second main electrode. When a maximum voltage is applied to the display panel, the liquid crystal layer has an average Azimuthal Angle represented as y1, satisfying B1<y1<A1, A1=$0.0000025x^3-0.0013716x^2+0.1847682x+41.6722409$, and B1=$-0.00001x^3+0.003335x^2-0.387814x+52.96697$; wherein x represents the pixel per inch of the display panel.

8 Claims, 5 Drawing Sheets

DISPLAY PANEL

This application claims the benefit of Taiwan application Serial No. 103132608, filed Sep. 22, 2014, the subject matter of which is incorporated herein by reference.

BACKGROUND OF THE INVENTION

Field of the Invention

The present disclosure is related in general to a display panel, and particularly to a display panel having better light transmittance.

Description of the Related Art

Liquid crystal displays have been widely applied in a variety of electronic products, such as laptops, tablet PCs, and etc. Moreover, along with the rapid advance of large-sized flat panel displays in the market, liquid crystal displays with light weight and miniaturized sizes have played very important roles and gradually replaced CRT displays to become the main stream in the market.

In addition, the reduction of sizes of pixels and the increase of image resolution have become the existing trends. However, while the pixel sizes reduce and the pixel per inch (ppi) increases, new issues arise affecting the display qualities. Therefore, researchers have been working on providing liquid crystal display panels having better display qualities.

SUMMARY OF THE INVENTION

The present disclosure is directed to a display panel. In the embodiments, when a maximum voltage is applied to the display panel, and an average Azimuthal Angle ($\psi$) of the liquid crystal layer in the first domain is within a predetermined range, the overall light transmittance of the display panel can be effectively increased.

According to an embodiment of the present disclosure, a display panel is provided. The display panel includes a first polarizer, a second polarizer, a first substrate, a second substrate, a liquid crystal layer, and a pixel array. The second polarizer is disposed on the first polarizer, and the first substrate is disposed between the first polarizer and the second polarizer. The second substrate is disposed between the first substrate and the second polarizer, and the liquid crystal layer is disposed between the first substrate and the second substrate. The pixel array is disposed on the first substrate and includes at least a pixel area, wherein a pixel electrode is disposed in the pixel area. The pixel electrode includes a first main electrode, a second main electrode, and a plurality of branch electrodes. The first main electrode and the second main electrode are substantially perpendicularly intersecting for defining a first domain, a second domain, a third domain, and a fourth domain of the pixel area. The branch electrodes are separately connected to the first main electrode or the second main electrode. When a maximum voltage is applied to the display panel, the liquid crystal layer has an average Azimuthal Angle ($\psi$) in the first domain, satisfying $B1<y1<A1$, $A1=0.0000025x^3-0.0013716x^2+0.1847682x+41.6722409$, and $B1=-0.00001x^3+0.003335x^2-0.387814x+52.96697$; wherein y1 represents the average Azimuthal Angle ($\psi$), and x represents the pixel per inch (ppi) of the display panel.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
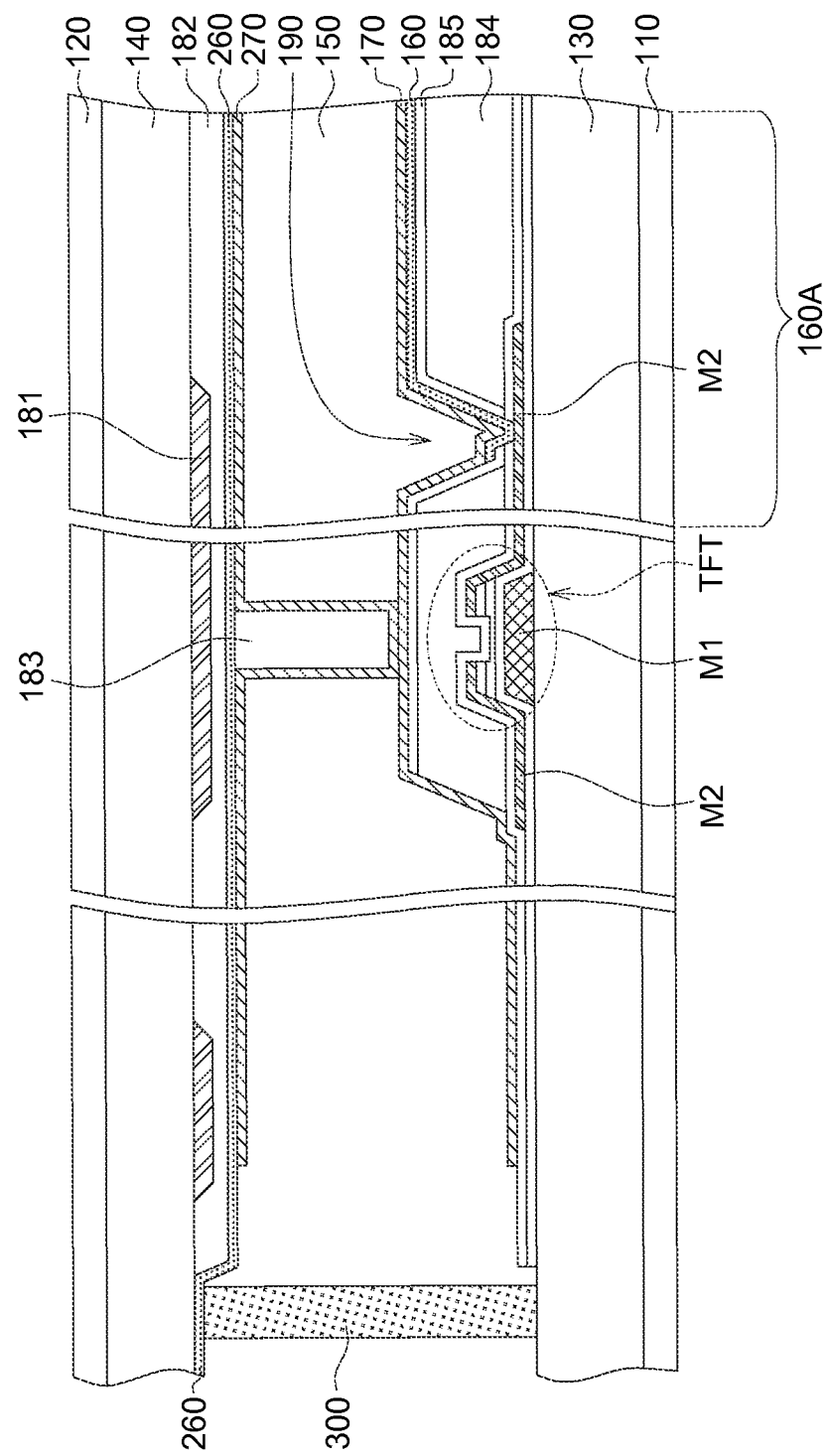
FIG. 1 shows a cross-sectional view of a display panel according to an embodiment of the present disclosure.

According to the embodiments of the present disclosure, when a maximum voltage is applied to the display panel, and an average Azimuthal Angle ($\psi$) of the liquid crystal layer in the first domain is within a predetermined range, the overall light transmittance of the display panel can be effectively increased. The embodiments are described in details with reference to the accompanying drawings. The identical elements of the embodiments are designated with the same or similar reference numerals. Also, it is to be noted that the drawings may be simplified for illustrating the embodiments. Thus, the specification and the drawings are to be regard as an illustrative sense rather than a restrictive sense. The details of the structures of the embodiments are for exemplification only, not for limiting the scope of protection of the disclosure. Detailed structures may be modified or changed by one skilled in the art after having the benefit of this description of the disclosure.

FIG. 1 shows a cross-sectional view of a display panel 100 according to an embodiment of the present disclosure. As shown in FIG. 1, the display panel 100 includes a first polarizer 110, a second polarizer 120, a first substrate 130, a second substrate 140, and a liquid crystal layer 150. The second polarizer 120 is disposed on the first polarizer 110. The first substrate 130 is disposed between the first polarizer 110 and the second polarizer 120, and the second substrate 140 is disposed between the first substrate 130 and the second polarizer 120. The liquid crystal layer 150 is disposed between the first substrate 130 and the second substrate 140. A pixel array 169 (not shown in FIG. 1) is disposed on the first substrate 130 and includes at least a pixel area 160A.

Figure 2:
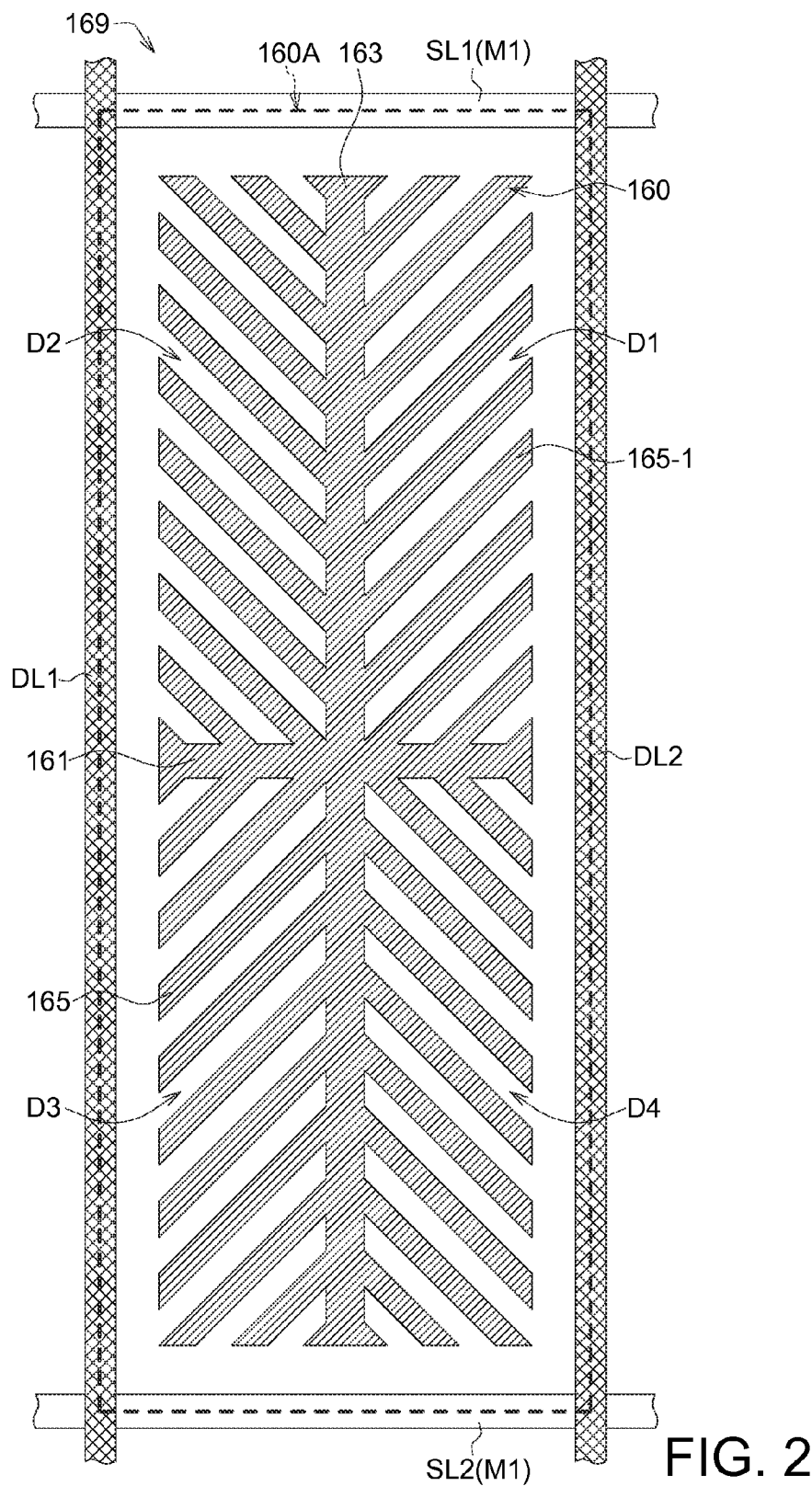
FIG. 2 shows a top view of a portion of a pixel array according to an embodiment of the present disclosure.

FIG. 2 shows a top view of a portion of a pixel array according to an embodiment of the present disclosure. As shown in FIG. 2, the display panel 100 includes a pixel electrode 160 disposed in the pixel area 160A. The pixel electrode 160 includes a first main electrode 161, a second main electrode 163, and a plurality of branch electrodes 165. The first main electrode 161 and the second main electrode 163 are substantially perpendicularly intersecting for defining a first domain D1, a second domain D2, a third domain D3, and a fourth domain D4 of the pixel area 160A. These branch electrodes 165 are separately connected to the first main electrode 161 or the second main electrode 163. In the present embodiment, the pixel area 160A having four domains is taken as an example; however, the number of domains of the pixel area 160A defined by the first main electrode 161 or the second main electrode 163 is not limited thereto. The pixel area 160A may correspond to the red filter portion, the green filter portion or the blue filter portion of a color filter layer (not shown in FIG. 2). The pixel electrode 160 is electrically connected to a data line via a contact hole (not shown in FIG. 2) and controls the turning-on or turning-off of a channel (not shown in FIG. 2) of a thin film transistor element through a scan line, thereby controlling the on-off of the electrical connection between the data line and the pixel electrode 160. The data line may be the data line DL1 or the data line DL2 as shown in FIG. 2, and the scan line for controlling the turning-on and turning-off of the thin film transistor element may be the scan line SL1 or the scan line SL2 as shown in FIG. 2. However, the design may depend on actual needs and is not limited to the connection arrangement of the pixel electrode 160, the data lines, and the scan lines as illustrated in the present embodiment.

As shown in FIG. 1, in the embodiment, the display panel 100 may further include a first alignment layer 170, at least a protection layer 185, a planarization layer 184, a contact hole 190, a thin film transistor element TFT, a plurality of metal lines M1, M2, a contralateral electrode 260, and a second alignment layer 270. The metal lines M1, M2 are located on the first substrate 130, and the protection layer 185 covers at least a portion of the metal lines M1, M2. The first alignment layer 170 is located on the first substrate 130 and located on the protection layer 185, and the second alignment layer 270 is located on the second substrate 140. The contralateral electrode 260 is located on the second substrate 140. The contralateral electrode 260 may be a full-plane electrode or a patterned electrode depending on the design needs. In the embodiment, the pixel electrode 160 is electrically connected to the metal line M2 (data line) via the contact hole 190 and controls the turning-on and turning-off of the channel of the thin film transistor element TFT via the metal line M1 (scan line), thereby controlling the turning-on and turning-off of the electrical connection between the metal line M2 (data line) and the pixel electrode 160.

As shown in FIG. 1, in the embodiment, the display panel 100 may further include a light-shielding layer 181, a color filter layer 182, and/or a plurality of spacers 183. In the embodiment, the light-shielding layer 181 is such as a black matrix (BM) located on the second substrate 140. The color filter layer 182 is located on the second substrate 140. In other embodiments, the color filter layer 182 may be located on the first substrate 130, such as a color filer on array, wherein the color filter layer may be disposed at the planarization layer 184, and the second substrate 140 is not disposed with any color filter layer thereon. The spacers 183 are located between the first substrate 130 and the second substrate 140 for providing a cell gap for disposing the liquid crystal layer 150.

Figure 3:
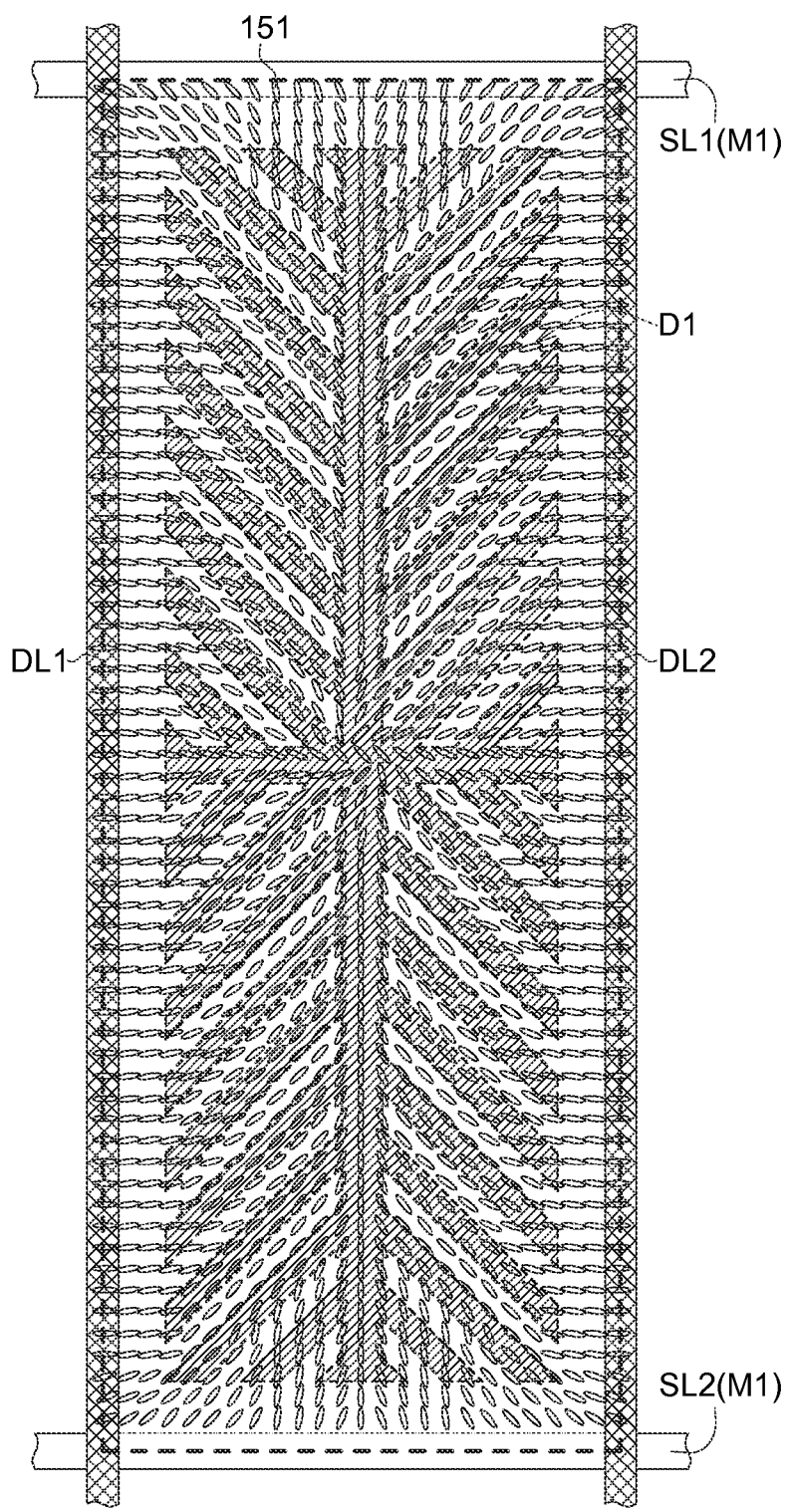
FIG. 3 shows a top view of twisting liquid crystal molecules of a liquid crystal layer when applied with a voltage according to an embodiment of the present disclosure.

FIG. 3 shows a top view of twisting liquid crystal molecules 151 of a liquid crystal layer 150 when applied with a voltage according to an embodiment of the present disclosure. In the embodiment, the metal lines M1 may include such as the scan line SL1 and the scan line SL2, and the metal lines M2 may include such as the data line DL1 and the data line DL2. As shown in FIGS. 2-3, the first domain D1 indicates the region defined by the scan line SL1, the data line DL2, and the two main electrodes, the second domain D2 indicates the region defined by the scan line SL1, the data line DL1, and the two main electrodes, the third domain D3 indicates the region defined by the scan line SL2, the data line DL1, and the two main electrodes, and the fourth domain D4 indicates the region defined by the scan line SL2, the data line DL2, and the two main electrodes. Referring to FIGS. 1-3, when a maximum voltage is applied to the display panel 100, the liquid crystal layer 150 has an average Azimuthal Angle ($\psi$) in the first domain D1, satisfying B1<y1<A1, A1=$0.0000025x^3-0.0013716x^2+0.1847682x+41.6722409$, and B1=$-0.00001x^3+0.003335x^2-0.387814x+52.96697$; wherein y1 represents the average Azimuthal Angle, and x represents the pixel per inch (ppi) of the display panel 100. It is to be noted that the liquid crystal molecules located in different locations of the liquid crystal layer 150 may have different Azimuthal Angles; therefore, the average Azimuthal Angle described herein represents the average value of the Azimuthal Angles of all of the liquid crystal molecules in one domain of the aperture region. When the domain has an average Azimuthal Angle satisfying the above-mentioned range, the domain has a relatively higher transmittance. The average Azimuthal Angle indicates an acute angle between a liquid crystal molecule and a short side of a sub-pixel as the liquid crystal molecule is projected on a plane of a substrate.

In an embodiment, the average Azimuthal Angle of the liquid crystal layer 150 in the first domain D1 may be represented by the following: B2<y1<A2, A2=$-0.00000093x^3-0.00017278x^2+0.05904418x+44.24138021$, and B2=$-0.000009x^3+0.003155x^2-0.345833x+52.230081$, wherein y1 represents the average Azimuthal Angle ($\psi$), and x represents the pixel per inch (ppi) of the display panel 100.

In an embodiment, the average Azimuthal Angle of the liquid crystal layer 150 in the first domain D1 may also be represented by the following: y1 = $-0.000007x^3+0.002039x^2-0.188458x+49.22998$, wherein y1 represents the average Azimuthal Angle ($\psi$), and x represents the pixel per inch (ppi) of the display panel 100.

In some embodiments, x is about 34-200 ppi, and y1 is about 37-46 degrees.

Figure 4:
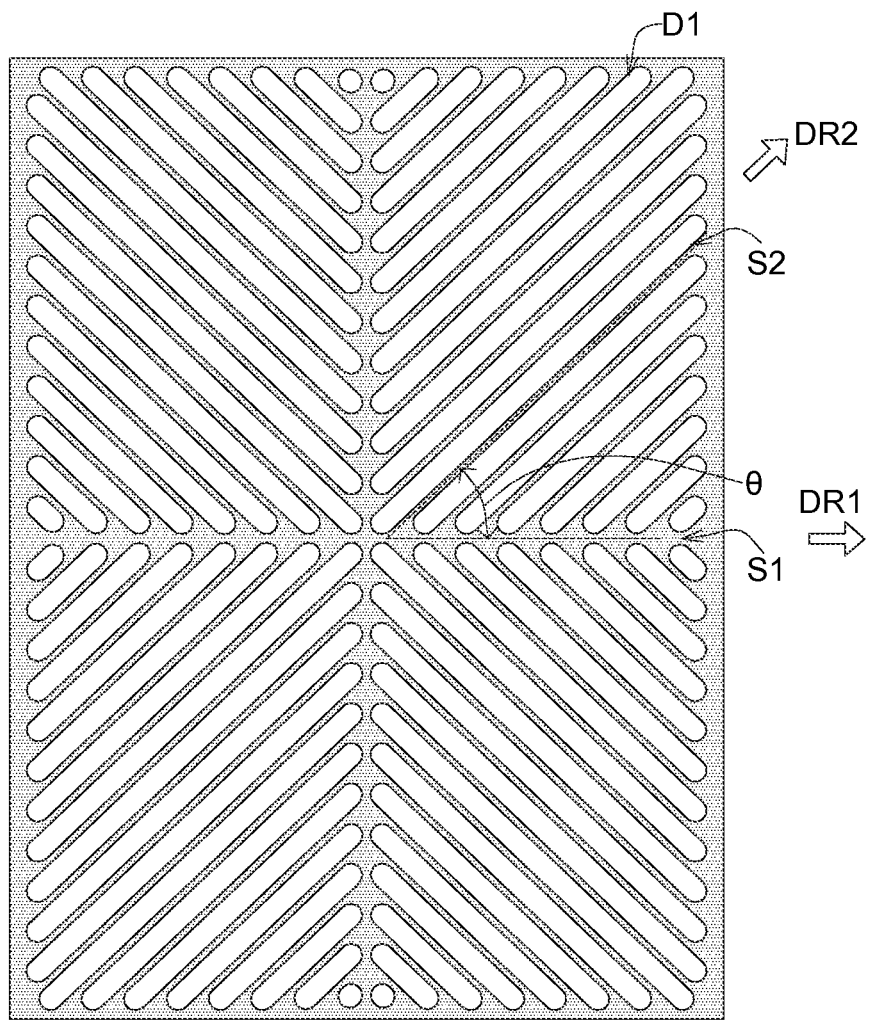
FIG. 4 shows a top view of dark lines shown by a display panel according to an embodiment of the present disclosure.

FIG. 4 shows a top view of dark lines shown by a display panel 100 according to an embodiment of the present disclosure. Referring to FIGS. 1-2 and 4, when a light passes through the display panel 100, an absorption axis or a transmission axis of the first polarizer 110 corresponds to a first dark line S1, a first branch electrode 165-1, which is one of the branch electrodes 165 in the first domain D1, corresponds to a second dark line S2. In the present embodiment, the first dark line S1 is substantially parallel to a short side of a sub-pixel. As shown in FIG. 4, the first dark line S1 extends toward a first direction DR1, the second dark line S2 extends toward a second direction DR2, and the first direction DR1 and the second direction DR2 form at least a dark line angle $\theta$, wherein the dark line angle $\theta$ is such as larger than 40 degrees and smaller than 70 degrees.

In the embodiment, the dark line angle $\theta$ may be represented by the following: E1<y2<C1, wherein C1=$-0.0000088x^3+0.003137x^2-0.174696x+51.88564$, E1=$-0.0000091x^3+0.0030904x^2-0.2500348x+46.9036489$, wherein y2 represents the dark line angle $\theta$, and x represents the pixel per inch (ppi) of the display panel 100.

In one embodiment, the dark line angle $\theta$ may as well be represented by the following: E2<y2<C2, C2=$-0.0000088x^3+0.00313x^2-0.185729x+50.561052$, and E2=$-0.0000091x^3+0.0030973x^2-0.2390017x+47.5311601$, wherein y2 represents the dark line angle $\theta$, and x represents the pixel per inch (ppi) of the display panel 100.

In some embodiments, x is about 34-200 ppi, and y2 is about 40-70 degrees.

In one embodiment, the dark line angle θ of the liquid crystal layer 150 in the first domain D1 may as well be represented by the following: $y2=-0.0000086x^3+0.0029697x^2-0.1938217x+48.3167928$, wherein y2 represents the dark line angle θ, and x represents the pixel per inch (ppi) of the display panel 100.

In some embodiments, x is about 34-200 ppi, and y2 is about 40-61 degrees.

In the embodiment, the first main electrode 161 is substantially parallel to the absorption axis of the first polarizer 110, and the second main electrode 163 is substantially parallel to the transmission axis of the first polarizer 110. In an embodiment, an angle between the absorption axis of the first polarizer 110 and the first main electrode 161 is about 0-2 degrees, and an angle between the transmission axis of the first polarizer 110 and the second main electrode 163 is about 0-2 degrees. In other embodiments, the absorption axes and the transmission axes of the first polarizer 110 and the second polarizer 120 may be switched simultaneously.

In other words, in the embodiment, the first dark line S1 is substantially parallel to the first main electrode 161, the first branch electrode 165-1 is substantially parallel to the second dark line S2, and the absorption axis of the first polarizer 110 is substantially parallel to the first dark line S1.

It is to be noted that the description of "substantially parallel to" indicates being basically parallel with slight tolerance of an angle difference resulting from alignment errors. For example, the absorption axis of the first polarizer 110 and the first main electrode 161 may form an angle of about ±0-2 degrees caused by an alignment shift.

The following embodiments are for further description of the characteristics of the display panel 100 of the present disclosure.

Table 1 shows the simulation results of pixel per inch (ppi) of the display panel 100 vs. average Azimuthal Angles (ψ) while the angle between the branch electrode 165 and the first main electrode 161 is 45 degrees.

TABLE 1

|  | ppi | | | | |
| --- | --- | --- | --- | --- | --- |
|  | 90 | 125 | 141 | 157 | 200 |
| Pixel width (μm) | 94 | 68 | 60 | 54 | 42 |
| Average Azimuthal Angles (ψ) | 39.7° | 37.96° | 36.64° | 35.41° | 32.13° |

According to the simulation results as shown in Table 1, as the pixel width (the size of a pixel) reduces and the pixel per inch (ppi) increases, the liquid crystal layer 150 is influenced by the fringe electric field, which causes a larger shift of the average Azimuthal Angle, resulting in a decrease of the light transmittance of the display panel 100.

The fringe electric field described herein refers to the influence from the electric fields generated from the metal lines and the main electrodes surrounding one single domain. For example, as shown in FIG. 2, the first domain D1 is taken as an example, the first domain D1 is influenced by the margin electric filed generated from the data line DL2, the scan line S1L1, the first main electrode 161, and the second main electrode 163. In other words, for a single domain, all of the four edges of the single domain may be influenced by the fringe electric field.

Table 2 shows the relationships between the average Azimuthal Angles (ψ) and the light transmittance gain of the liquid crystal layer 150 while the angle between the branch electrode 165 and the first main electrode 161 varies. The pixel per inch (ppi) of the display panel 100 is set at 157, and the gain of the light transmittance with the angle between the branch electrode 165 and the first main electrode being 45 degrees is set at 0 as a base reference.

TABLE 2

|  | Angle between branch electrode and main electrode | | | | |
| --- | --- | --- | --- | --- | --- |
|  | 45° | 50° | 55° | 60° | 65° |
| Light transmittance (%) | 0 | 2.69 | 3.05 | 3.61 | 2.84 |
| Average Azimuthal Angles (ψ) | 35.41° | 39.27° | 42.6° | 45.17° | 45.78° |

According to the simulation results as shown in Table 2, when the angle between the branch electrode 165 and the first main electrode 161 is 60 degrees, the average Azimuthal Angle (ψ) of the liquid crystal layer 150 reaches the best calibration result, which is adjusted to 45.17 degrees. In addition, in the embodiment where the angle between the branch electrode 165 and the first main electrode 161 is 60 degrees, the liquid crystal layer 150 having the average Azimuthal Angle (ψ) of 45.17 degrees is provided with the best light transmittance gain, such that the overall efficiency of the liquid crystal is increased.

Figure 5:
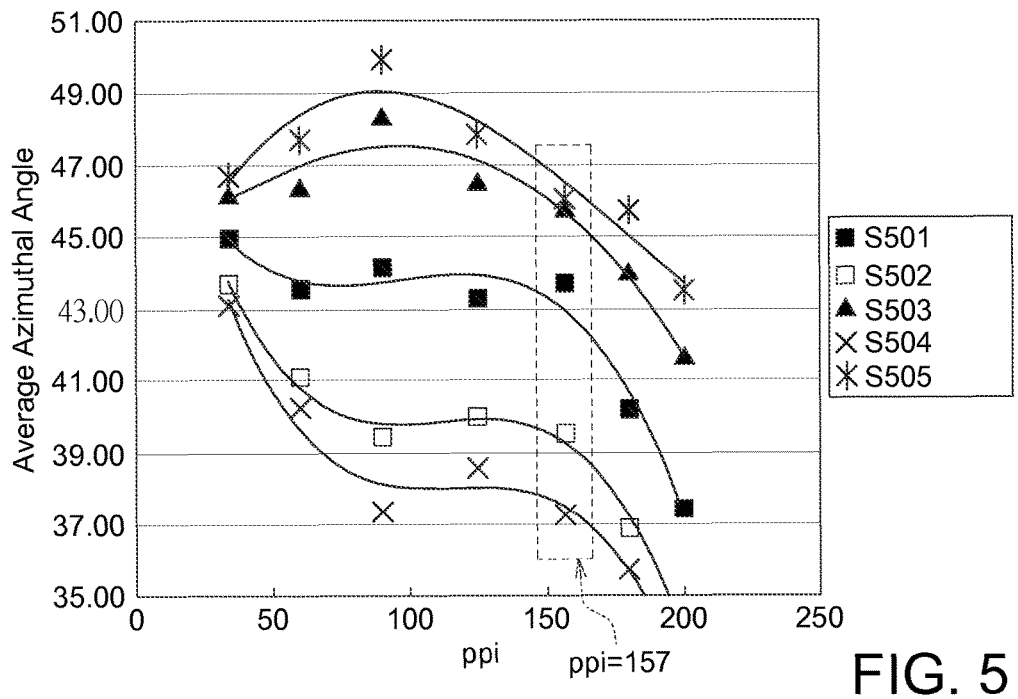
FIG. 5 shows a relationship of an average Azimuthal Angle ($\psi$) vs. pixel per inch (ppi) of a liquid crystal layer of a display panel according to an embodiment of the present disclosure.

FIG. 5 shows the relationships of average Azimuthal Angles (ψ) vs. pixel per inch (ppi) of the liquid crystal layer 150 of the display panel 100 according to an embodiment of the present disclosure. The light transmittance gain of curve S501 is the best, the light transmittance gains of curve S502 and curve S503 are 1% less than that of curve S501, and the light transmittance gains of curve S504 and curve S505 are 2% less than that of curve S501. For example, while ppi=157, the best light transmittance gain (curve S501) of the display panel 100 is 3.61%, the second best light transmittance gain (curve S502 and curve S503) is 2.61%, and the next best light transmittance gain (curve S504 and curve S505) is 1.61%. However, it is to be noted that the best light transmittance gain may vary while ppi varies. That is, it is not necessary that the light transmittance gain of each of the points on curve S501 is 3.61%.

Table 3 shows the data of curves S501-S505 as shown in FIG. 5. The above-mentioned relationships regarding the average Azimuthal Angles (ψ) of the liquid crystal layer 150 in the first domain D1 (the formulae with A1, A2, B1, B2, and etc.) are calculated from the data in Table 3.

TABLE 3

| ppi | 34 | 60 | 90 | 125 | 157 | 180 | 200 |
| --- | --- | --- | --- | --- | --- | --- | --- |
| Best light transmittance gain-2% (curve S505) | 46.66 | 47.67 | 49.89 | 47.86 | 46.05 | 45.71 | 43.48 |
| Best light transmittance gain-1% (curve S503) | 46.18 | 46.35 | 48.32 | 46.53 | 45.78 | 43.98 | 41.66 |
| Best light transmittance gain (curve S501) | 44.96 | 43.52 | 44.15 | 43.28 | 43.68 | 40.17 | 37.48 |
| Best light transmittance gain-1% (curve S502) | 43.66 | 41.10 | 39.45 | 39.96 | 39.55 | 36.92 | 34.01 |
| Best light transmittance gain-2% (curve S504) | 43.09 | 40.25 | 37.34 | 38.57 | 37.25 | 35.73 | 32.68 |

Figure 6:
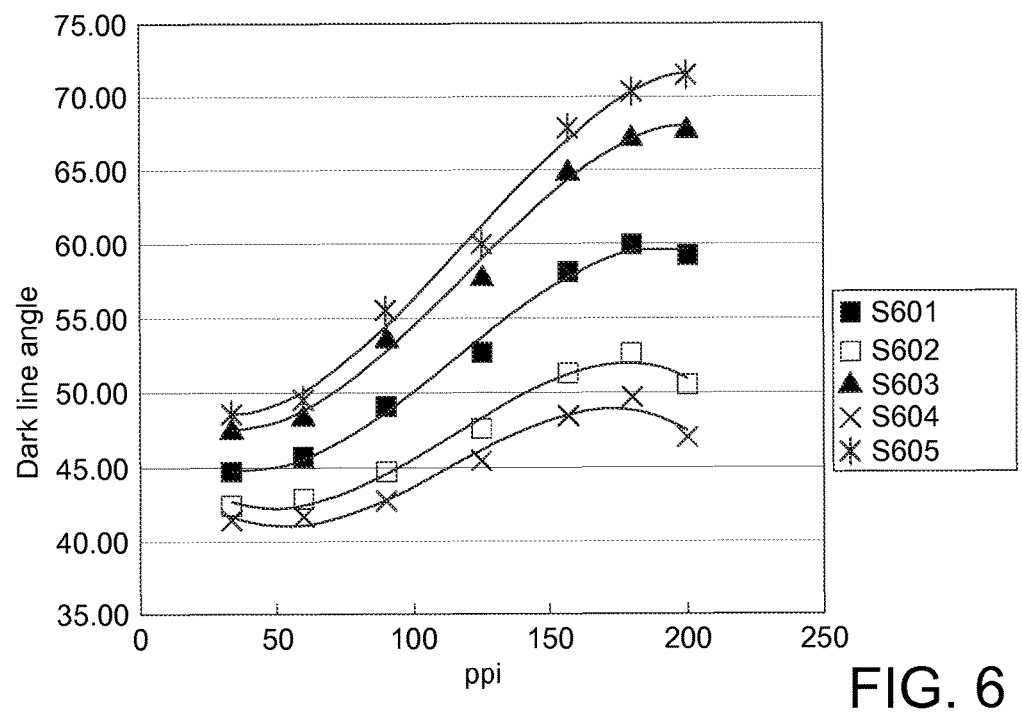
FIG. 6 shows a relationship of a dark line angle vs. pixel per inch (ppi) of a display panel according to an embodiment of the present disclosure.

FIG. 6 shows relationships of dark line angles θ vs. pixel per inch (ppi) of the display panel 100 according to an embodiment of the present disclosure. The light transmittance gain of curve S601 is the best, the light transmittance gains of curve S602 and curve S603 are 1% less than that of curve S601, and the light transmittance gains of curve S604 and curve S605 are 2% less than that of curve S601. For example, while ppi=157, the best light transmittance gain (curve S601) of the display panel 100 is 3.61%, the second best light transmittance gain (curve S602 and curve S603) is 2.61%, and the next best light transmittance gain (curve S604 and curve S605) is 1.61%. However, it is to be noted that the best light transmittance gain may vary while ppi varies. That is, it is not necessary that the light transmittance gain of each of the points on curve S601 is 3.61%.

Table 4 shows the data of curves S601-S605 as shown in FIG. 6. The above-mentioned relationships regarding the dark line angles θ (the formulae with C1, C2, E1, E2, and etc.) are calculated from the data in Table 4.

TABLE 4

| ppi | 34 | 60 | 90 | 106 | 125 | 157 | 180 | 200 |
|---|---|---|---|---|---|---|---|---|
| Best light transmittance gain-2% (curve S605) | 48.62 | 49.60 | 55.59 | 56.84 | 60.01 | 68.64 | 70.33 | 71.52 |
| Best light transmittance gain-1% (curve S603) | 47.55 | 48.44 | 53.70 | 54.52 | 57.88 | 65.65 | 67.30 | 67.92 |
| Best light transmittance gain (curve S601) | 44.69 | 45.64 | 49.15 | 48.92 | 52.73 | 58.15 | 59.99 | 59.24 |
| Best light transmittance gain-1% (curve S602) | 42.38 | 42.84 | 44.61 | 43.32 | 47.58 | 51.23 | 52.68 | 50.56 |
| Best light transmittance gain-2% (curve S604) | 41.31 | 41.68 | 42.73 | 41.00 | 45.44 | 48.24 | 49.65 | 46.96 |

Table 5 summarizes the shifts of angles according to Tables 3-4. It is apparent that most of the difference between the average Azimuthal Angle and 45° increases along with the increase of the pixel per inch (ppi).

TABLE 5

| ppi | 34 | 60 | 90 | 106 | 125 | 157 | 180 | 200 |
|---|---|---|---|---|---|---|---|---|
| Best dark line angle | 44.69 | 45.64 | 49.15 | 48.92 | 52.73 | 58.15 | 59.99 | 59.24 |
| Average Azimuthal Angle (ψ) | 44.96 | 43.52 | 44.15 | 43.33 | 43.28 | 43.18 | 40.17 | 37.48 |
| Difference between the average Azimuthal Angle and 45° | −0.04 | −1.48 | −0.85 | −1.67 | −1.72 | −1.82 | −4.83 | −7.52 |

While the image resolution increases and the pixel size decreases, the fringe electric field generated from the data lines, scan lines and cross-shaped main electrodes has more significant influence on each of the domains. If only the light transmittance of the central area of one domain is emphasized and thus the average Azimuthal Angles (ψ) are all adjusted to 45°, as a result, the light transmittance of areas close to the peripheral of the domain would be very low. Moreover, as the pixel size decreases and the region influenced by the fringe electric field is more significant to the whole domain region, the overall average light transmittance of the display panel would largely decrease.

Therefore, according to the embodiments of the present disclosure, as the pixel per inch (ppi) increases and the pixel size decreases, the overall average light transmittance of the display panel 100 can be increased by adjusting the average Azimuthal Angle (ψ) and/or the dark line angle, rather than fixing these angles at 45°.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display panel, comprising:
   a first polarizer;
   a second polarizer;
   a first substrate disposed between the first polarizer and the second polarizer;
   a second substrate disposed between the first substrate and the second polarizer;
   a liquid crystal layer disposed between the first substrate and the second substrate; and
   a pixel array disposed on the first substrate and comprises at least one pixel area, wherein a pixel electrode is disposed in the pixel area, and the pixel electrode comprises:
      a first main electrode;
      a second main electrode, wherein the first main electrode and the second main electrode are substantially perpendicularly intersecting for defining a first domain, a second domain, a third domain, and a fourth domain of the pixel area; and
      a plurality of branch electrodes separately connected to the first main electrode or the second main electrode;
   wherein when a light passes through the display panel, the first main electrode corresponds to a first dark line extending toward a first direction, a first branch electrode of the branch electrodes in the first domain corresponds to a second dark line extending toward a second direction, and the first direction and the second direction form at least a dark line angle, wherein the dark line angle satisfies $E2 < y2 < C2$, wherein $C2 = -0.0000088x^3 + 0.00313x^2 - 0.185729x + 50.561052$, $E2 = -0.0000091x^3 + 0.0030973x^2 -$ $0.2390017x+47.5311601$, and y2 represents the dark line angle, x represents the pixel per inch (ppi) of the display panel, and x is 60-200.

2. The display panel according to claim 1, wherein when a maximum voltage is applied to the display panel, the liquid crystal layer has an average Azimuthal Angle ($\psi$), satisfying $B1<y1<A1$, $A1=0.0000025x^3-0.0013716x^2+0.1847682x+41.6722409$, and $B1=-0.00001x^3+0.003335x^2-0.387814x+52.96697$, wherein y1 represents the average Azimuthal Angle.

3. The display panel according to claim 2, wherein a relationship between the average Azimuthal Angle and the pixel per inch of the display panel satisfies: $y1=-0.000007x^3+0.002039x^2-0.188458x+49.22998$.

4. The display panel according to claim 2, wherein y1 is 37-46 degrees.

5. The display panel according to claim 1, wherein y2 is 40-61 degrees.

6. The display panel according to claim 1, wherein an absorption axis of the first polarizer is substantially parallel to the first dark line, and the first branch electrode is substantially parallel to the second dark line.

7. The display panel according to claim 1, wherein an angle between an absorption axis of the first polarizer and the first main electrode is 0-2 degrees.

8. The display panel according to claim 1, wherein the first main electrode is substantially parallel to an absorption axis of the first polarizer, and the second main electrode is substantially parallel to a transmission axis of the first polarizer.

* * * * *